United States Patent [19]

Cuénoud et al.

[11] 4,150,922

[45] Apr. 24, 1979

[54] ELECTROMAGNET MOTOR CONTROL FOR CONSTANT VOLUME PUMPING

[75] Inventors: Gérard Cuénoud, Grand-Lancy; Rudolf Farkas, Geneva; Georges Revillet, Onex; Manuel Sanz, Grand-Lancy, all of Switzerland

[73] Assignee: Battelle Memorial Institute, Geneva, Switzerland

[21] Appl. No.: 698,998

[22] Filed: Jun. 23, 1976

[30] Foreign Application Priority Data

Jun. 27, 1975 [CH] Switzerland ........................ 8361/75

[51] Int. Cl.[2] ........................ F04B 49/06; F04B 17/04; F04B 35/04; F16J 1/10

[52] U.S. Cl. ...................................... 417/45; 417/317; 417/413; 417/417; 417/505; 318/127; 92/84

[58] Field of Search ............... 417/413, 416, 417, 479, 417/505, 45, 317; 222/214, 209; 128/214 F; 92/84; 74/53; 318/127, 128, 332

[56] References Cited

U.S. PATENT DOCUMENTS

| | | | |
|---|---|---|---|
| 2,297,084 | 9/1942 | Swallow | 318/128 |
| 2,638,849 | 5/1953 | Budlane | 417/413 |
| 2,785,638 | 3/1957 | Moller | 417/505 |
| 2,864,116 | 12/1958 | Rohr | 92/84 |
| 2,951,556 | 9/1960 | Jackson et al. | 417/471 |
| 3,118,383 | 1/1964 | Woodward | 417/45 |
| 3,424,090 | 1/1969 | Hyde | 417/44 |
| 3,741,687 | 6/1973 | Nystroem | 417/317 |
| 3,819,305 | 6/1974 | Klochemann et al. | 417/413 |

FOREIGN PATENT DOCUMENTS 887429 7/1953 Fed. Rep. of Germany ........... 417/479

*Primary Examiner*—Carlton R. Croyle
*Assistant Examiner*—Thomas I. Ross
*Attorney, Agent, or Firm*—Karl F. Ross

[57] ABSTRACT

A constant-volume increment pipetting arrangement for use particularly in connection with analysis of minute specimen volumes of biological fluids. The arrangement, which is designed to have a very low inertia factor, comprises a pumping unit having a pair of two-port valves with a duct running between a port from each valve, wherein at least a portion of the duct wall is movable to provide a variable volume pipetting chamber. The second port of one valve serves as the intake port for the fluid to be pipetted and the remaining port of the other valve serves as the delivery port. Three reciprocating drive elements are provided, connected one each to the valves and to the movable portion of the duct wall. Associated with the drive elements is a sequential control means, wherein the control means portion for the drive element connected to the moving portion of the duct wall constitutes an electromagnet arrangement energizable by a periodic supply. Means are associated with the duct wall drive element for controlling the travel amplitude of the electromagnet's armature and thus the travel amplitude of this drive element. The volume of liquid displaced by the movement of the movable portion of the duct wall which arises from the controlled movement of the drive element associated therewith corresponds to the volume required for the pipetted increment, whatever variations in resistance may be encountered by the duct-related drive element.

6 Claims, 18 Drawing Figures

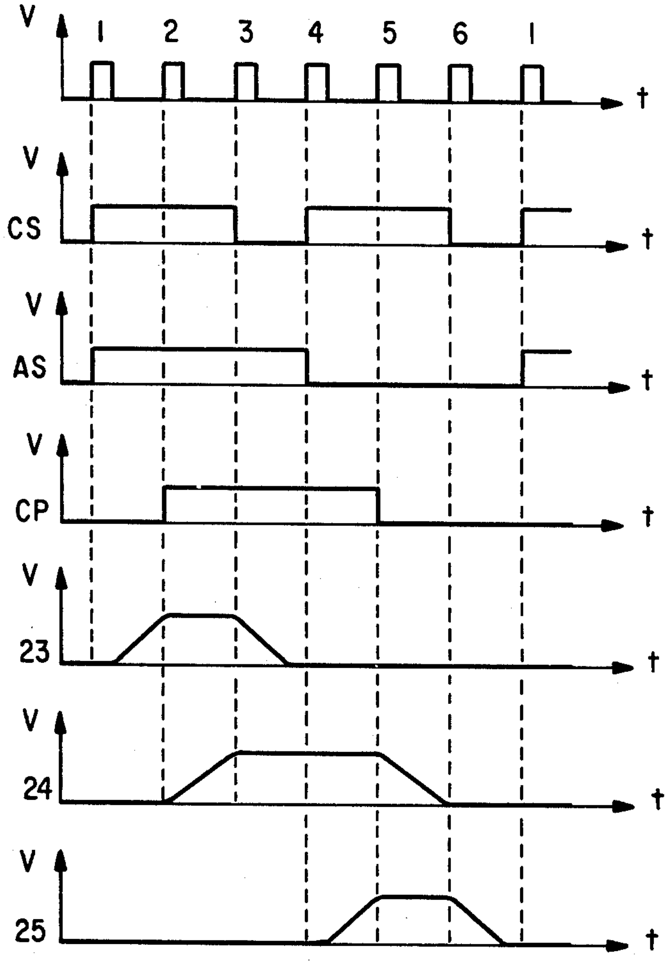
FIG. 6A
FIG. 6B
FIG. 6C
FIG. 6D
FIG. 6E
FIG. 6F
FIG. 6G
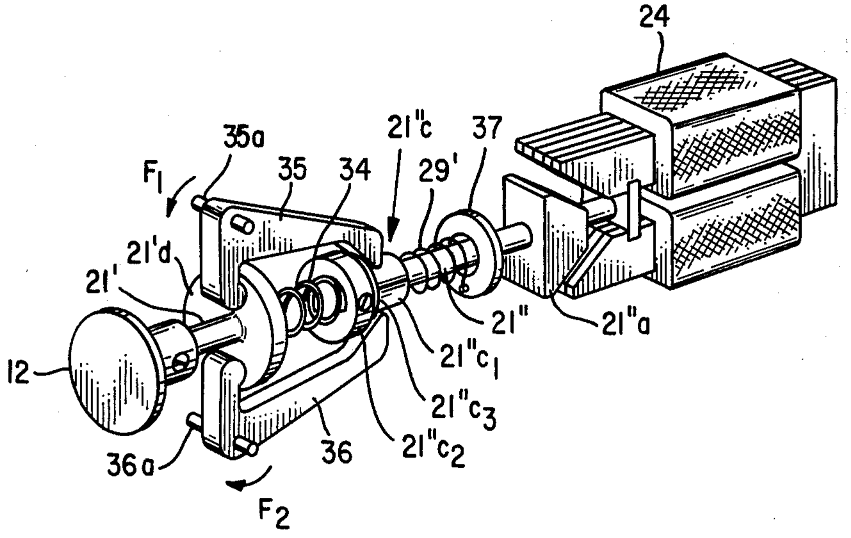
FIG. 7

ELECTROMAGNET MOTOR CONTROL FOR CONSTANT VOLUME PUMPING

BACKGROUND OF THE INVENTION

The tendency in liquid analysis techniques, inter alia as regards biological liquids, is towards ever smaller specimen volumes which are now a few microliters or even a few nanoliters. Various technical and medical factors in the case of biological liquids are helping to boost this trend. Medicine is deriving increasing amounts of information from analysis results, and so it is common for a number of different analyses to be made from a single sample, hence the need to reduce the volumes of liquid needed to make each analysis so that as small as sample as possible may be taken from the patient. The foregoing is applicable more particularly in the case of analyses of biological liquids taken from the newly born or when repeated samples must be taken from a single patient at frequent intervals. In practical terms, increasing the number of analyses causes space problems for laboratories, the only possible solution being to reduce the size of instruments and apparatus.

If such analyses are to continue to give results at the very strict levels of accuracy required for this purpose, the relationship of the liquid volumes mixed in the test tube must be absolutely correct. This is why the pipette is one of the elements governing analysis quality. Pipetts are used to introduce into test tubes the very small amount of liquid to be analyzed and the comparatively much larger amount of dilution liquid and of reagents in the case of liquid reagents.

It is difficult to devise a pipette which can operate very accurately in a ratio of volumes in a range of from 1 to 10 up to 1 to 100 or even 200 or more. One solution proposed for the problem is to use a pipette pumping constant-volume increments, such volume being the unit pumping volume of the pipette (see U.S. Pat. No. 3,679,331). Of course, the repetition rate of the increments must be fairly high if the rate of flow of diluents and reagents, which may often be more than tens of times greater than the rate of flow of the increment, is to permit sufficiently rapid pipetting, for if it is required to dilute a specimen in a volume of liquid of the order of from 100 to 200 times the pipette increment volume, the increments must be provided in a very rapid sequence if the operation is not to last more than a few seconds. Another important consideration is that the inertia of the pipette drive mechanism must be very low to ensure instant starting and stopping of the pipette.

The volume of the increment forming the working unit of the pipette must be reproducible accurately irrespective of the viscosity of the pumped liquid, the ambient termperature and the aging or wear of the pumping elements. These requirements occur frequently with pipettes; for instance, a pipette may be required to intake a few increments of a specimen for analysis and then to discharge a large number of increments for dilution.

The known pumping device, more particularly those driven by rotating motors (see U.S. Pat. No. 3,679,331), fail to meet all the foregoing requirements since systems driven by such motors have too great an inertia to be able to start and stop instantaneously between two increments. They take some time to run up to their normal operating speed and further time to stop. It is virtually impossible for such a device to start, then stop at the end of a single pump increment and change over consecutively and without transition from intake to discharge.

An electromagnetically operated pumping device has been suggested (see U.S. Pat. No. 3,819,305). Electromagnetic operation is satisfactory for on/off control such as the opening and closing of valves but cannot provide accurate control of the alternate variation of the volume of a pumping enclosure or chamber because of the amplitude fluctuations inherent in the movement of the moving element of an electromagnet or solenoid, and movement amplitude, which is directly linked with the size of the increments, must remain accurate to ±1%, corresponding to an accuracy of something like ±0.1 mm.

SUMMARY OF THE INVENTION

It is an object of this invention to provide a constant-volume-increment pipette which meets all the requirements hereinbefore mentioned.

This invention accordingly relates to a constant-volume-increment pipetting device comprising: a pumping unit having a duct connected at its ends to one of the two access ports of a first valve and of a second valve, at least some of the duct wall being movable so that a variable-volume pipetting chamber can be provided, the second such port of the valves being in the case of one valve the intake port for liquid to be pipetted by the device and in the case of the other valve the delivery port for pipetted liquid; three reciprocating drive elements connected one each to the valves and to the moving portion of the duct wall; and sequential control means for the latter elements, characterized in that the control means for the drive element connected to the moving portion of the duct wall is an electromagnet energizable by a periodic supply, means being associated with the drive element so to control the travel amplitude of the electromagnetic armature and therefore of the travel amplitude of the drive element, and that the volume of liquid displaced by the movement of the moving portion of the duct arising from the controlled movement of the drive element corresponds to the volume required for the pipetted increment, whatever variations in resistance may be encountered by the drive element.

Such a mechanism has a very low inertia. Also, the element driving the moving portion of the pipetting enclosure or chamber moves from a first axial position into a second axial position, the difference between the two positions corresponding to the volume of the required increment, so that accuracy is guaranteed irrespective of any disturbing influences. This is important consideration since the movement of the moving armature of an electromagnet or plunger of a solenoid in response to a given voltage energizing its winding varies in dependence upon the mechanical resistance encountered, something which is incompatible with the requirements hereinbefore referred to.

BRIEF DESCRIPTION OF THE DRAWINGS

An embodiment and three variants of a pipetting evice according to this invention are shown by way of example in the accompanying drawings wherein:

FIGS. 6a to 6g are diagrams showing characteristics signals produced at various phases in connection with the views in FIGS. 4 and 5;

FIG. 7 is a perspective view of a variant of a detail of the device shown in FIG. 1;

DESCRIPTION OF THE PREFERRED EMBODIMENT(S)

Figure 1:
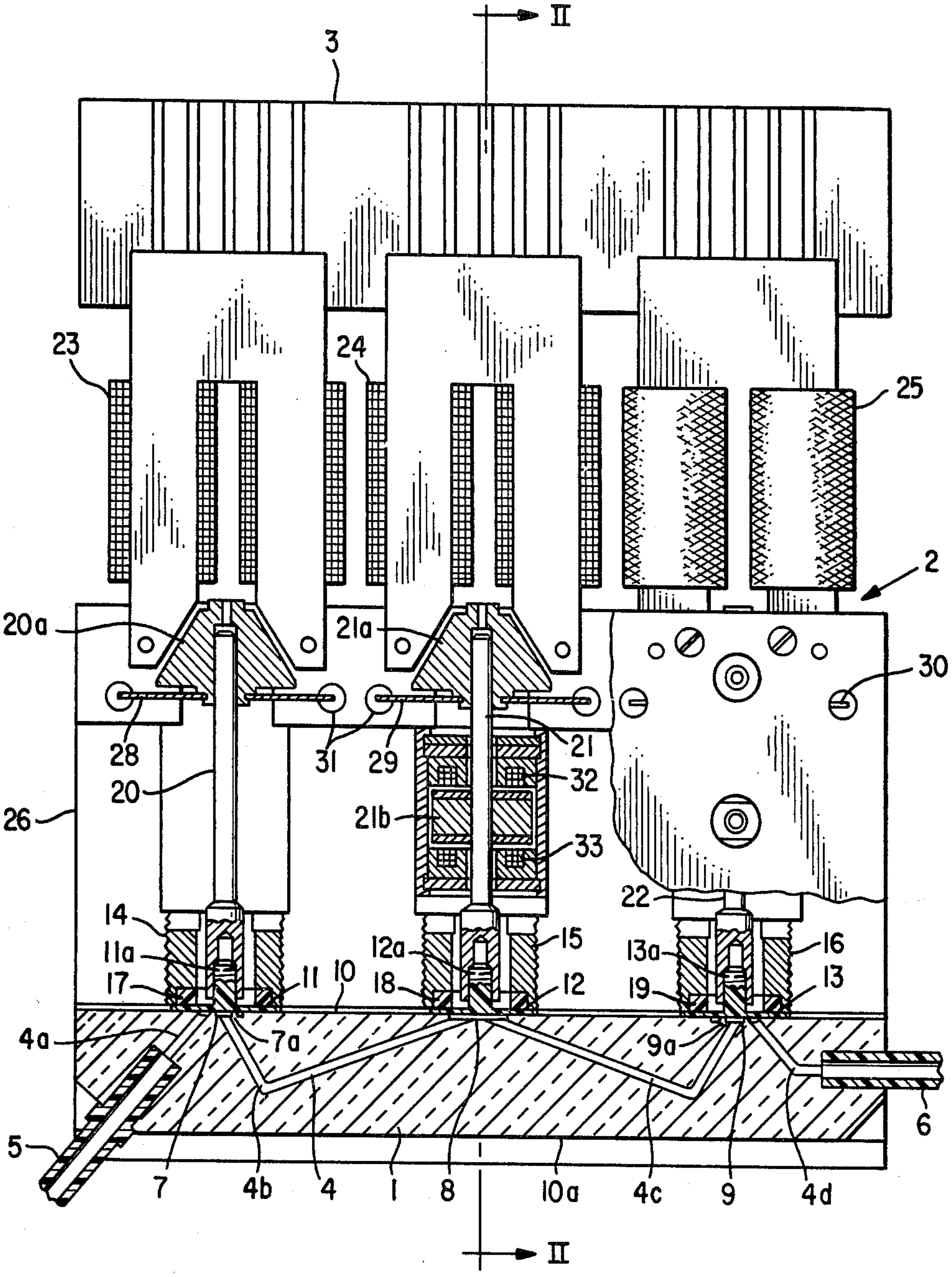
FIG. 1 is a partial breakaway view in side elevation of the device according to the invention.
Figure 2:
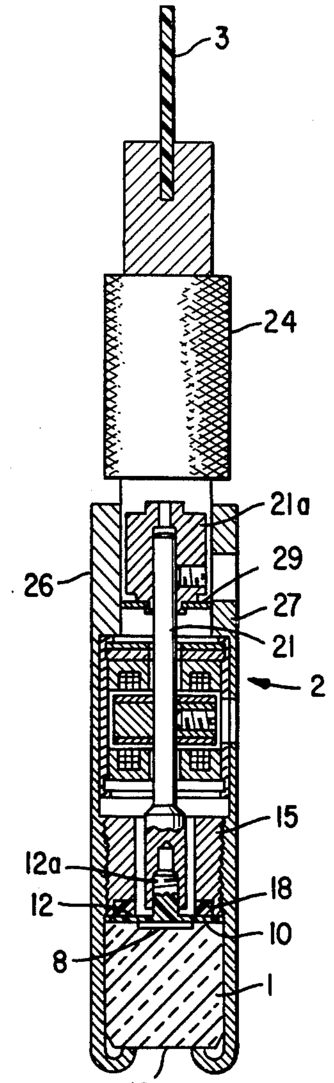
FIG. 2 is a section taken along the line II—II of FIG. 1.
Figure 4:
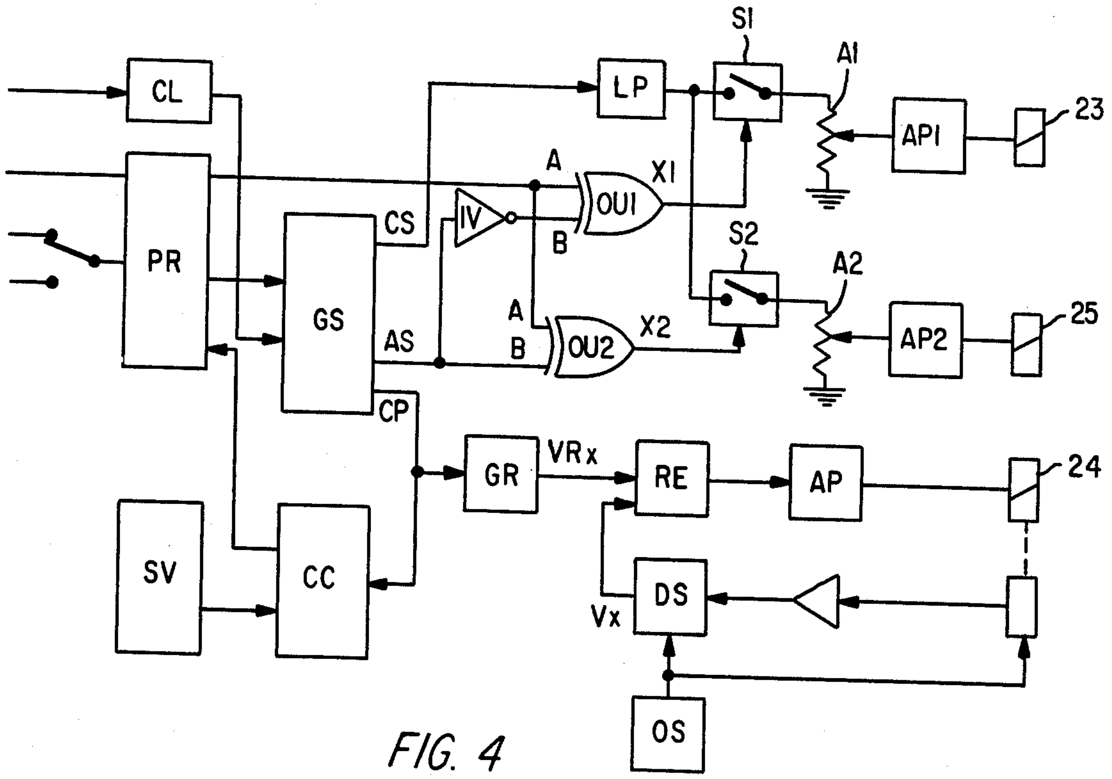
FIG. 4 is a block schematic diagram of the electric control circuit for the device.
Figure 5:
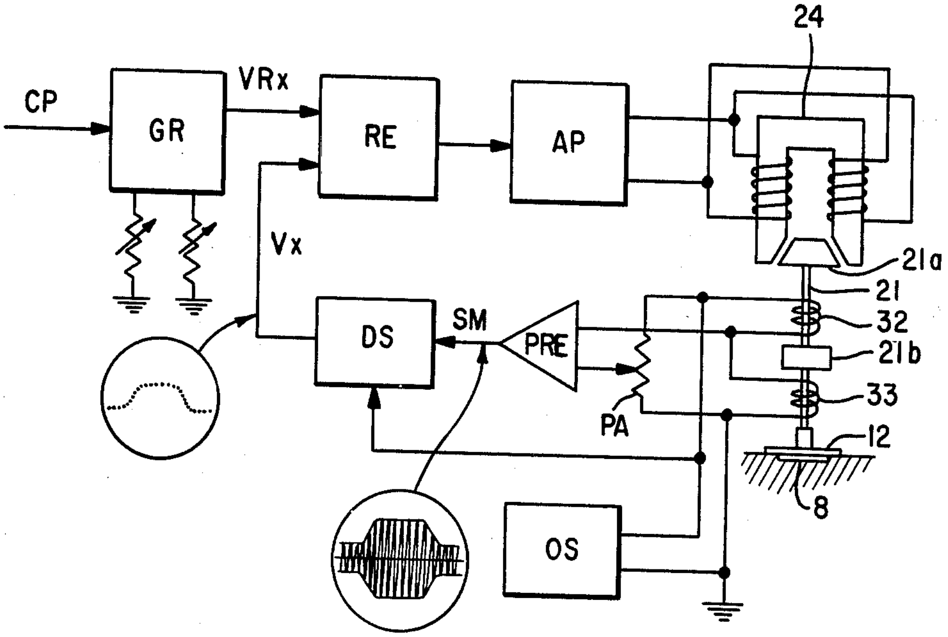
FIG. 5 shows a detail of the diagram of FIG. 4.

The pipetting device shown in FIGS. 1 and 2 comprises three separate portions—a pump casing 1, in the form of an oblong-shaped block made of a transparent material, e.g. glass, a control system 2 for the pump actuating elements, and an electrical connector 3 for connecting system 2 to an electric control circuit shown in block schematic form in FIGS. 4 and 5.

Figure 3:
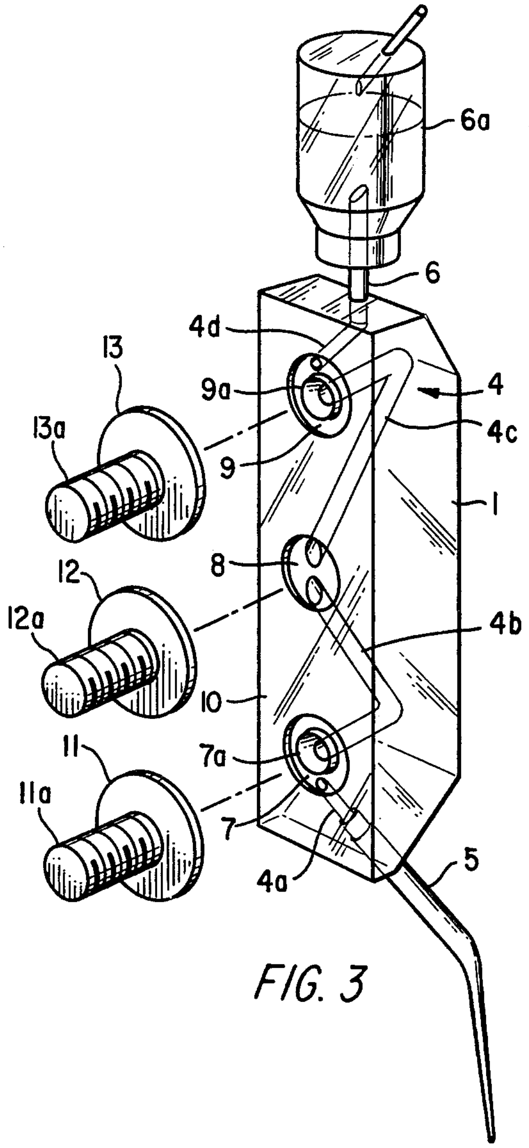
FIG. 3 is an exploded perspective view of the pump casing.

Referring to FIGS. 1 and 3, a duct 4 extending through casing 1 in subdivided into four sections—two terminal sections 4a, 4d which open to two opposite surfaces of casing 1 and two intermediate sections or portions 4b, 4c. Section or portion 4a terminates in a spigot 5 and portion 4d terminates in a spigot 6 adapted to be connected to a liquid reservoir 6a visible in FIG. 3. The intermediate portions 4b, 4c interconnect three vessels 7–9 contrived in that surface 10 of casing 1 which is near the system 2. Terminal portion 4a extends to vessel 7 and terminal portion 4d extends to vessel 9. As can be seen in FIG. 3, each of the two vessels 7, 9 has an annular projection 7a, 9a whose ridge or crest extends on casing surface 10. Projection 7a separates from one another those ends of duct portions4a, 4b which are associated with vessel 7, while projection 9a separates from one another those ends of duct portions 4c, 4d which are associated with vessel 9.

With the interposition of plastics ring gaskets 17–19, externally screwthreaded clamping rings 14–16, visible in FIGS. 1 and 2, clamp three circular diaphragms 11–13 respectively to surface 10 concentrically of vessels 7–9 respectively. The diameter of diaphragms 11–13 is greater than the diameter of the respective vessels so that the rings 14–16 compress the diaphragms 11–13 in those zones of the surface 10 which extend around the vessels 7–9, the rings 14–16 leaving the center of each diaphragm 11–13 free. The center of the outside surface of each diaphragm 11–13, which is a polythene moulding, is integral with a respective screwthreaded stud or finger or the like 11a, 12a, 13a engaged in respective internal screwthreading of three drive rods 20–22 respectively. The diameter of the members 11a–13a is substantially the same as the diameter of the annular projections 7a, 9a of the vessels 7, 9.

At their other ends the rods 20–22 each carry a trapezoidal soft-iron member 20a, 21a, 22a each engaged in the respective air gap of three electromagnets 23–25 respectively, the members 20a–22a being the moving armatures of the electromagnets. Rods 20–22 are connected to the mechanism frame, embodied by two plates 26, 27 visible in FIG. 2, by way of resilient bearings embodied by spring strips 28–30 respectively whose ends are secured to plates 26, 27 by pins 31 disposed on either side of the respective rods 20–22. The same extend through apertures centered on the central axes of the spring strips 28–30 which are rivetted to the members 20a–22a. When no current flows through the electromagnets 23 and 25, the spring strips 28 and 30 maintain the diaphragms 11 and 13 in engagement with the annular projections 7a, 9a respectively. When the diaghragms 11, 13 are in the position just described, those ends of the duct portions 4a, 4b which extend to the vessel 7 are separated from one another, as are those ends of the duct portions 4c, 4d which extend to the vessel 9. Consequently, the vessels 7, 9 and their associated diaphragms 11, 13 form two valves along the duct 4.

However, the vessel 8 and its associated diaphragm 12 cannot separate the duct portions 4b and 4c from one another since the vessel 8 is devoid of annular projections similar to the projections 7a, 9a of the vessels 7, 9, the vessel 8 and the diaphragm 12 forming the pumping element of the pipette, the pumping volume being determined by the volume variation of the space between the vessel wall and the diaphragm as a result of the drive rod 21 moving axially between its two end positions.

Figure 11:
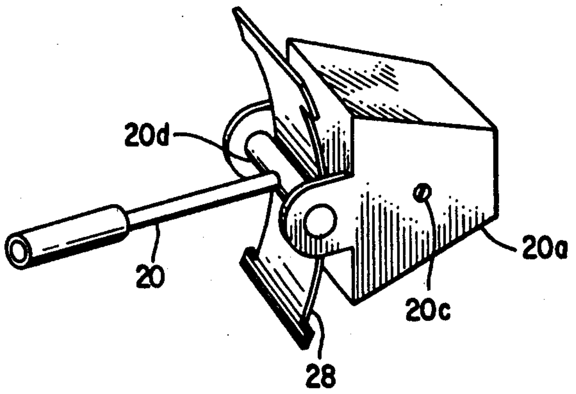
FIG. 11 is a perspective view of an alternative mechanical arrangement of the drive rods, spring strips and soft-iron members of the device shown in FIG. 1.
Figure 12:
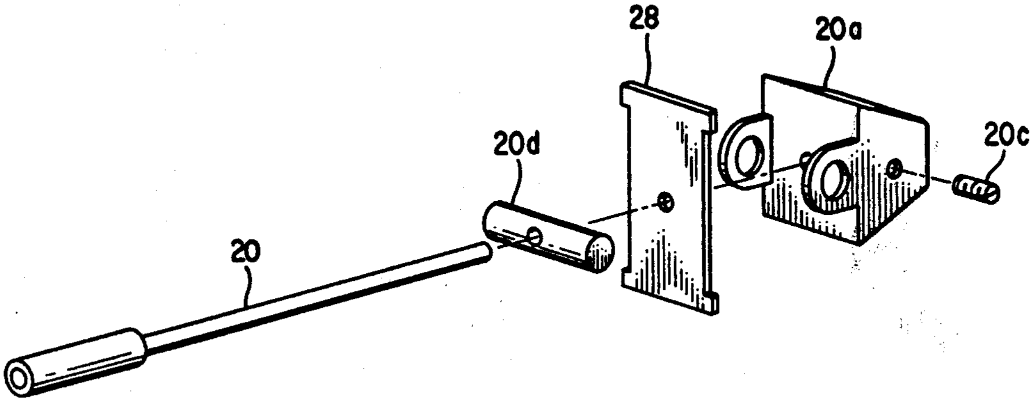
FIG. 12 is an exploded perspective view of the alternative arrangement shown in FIG. 11.

An interesting alternative arrangement of the drive rods, spring strips and soft-iron members of the device shown in FIG. 1 is depicted in FIGS. 11 and 12. In these pictures only the arrangement corresponding to driving rod 20 is shown, since this arrangement is identical to those corresponding to driving rods 21 or 22. Driving rod 20 is attached to soft-iron member 20a by a lateral screw 20c and passes freely through spring strip 28 and a transversal pin 20d which is applied against spring 28. Both ends of spring 28 are fitted on the casing of the pipetting device and the median part of spring 28 leans upon pin 20d. This arrangement differs from the one previously described in that spring 28 is not rivetted to member 20a, this member forming a stirrup with pin 20d, upon which spring 28 leans. It should be clear that in this alternative arrangement spring 28 has a great freedom of movement, which makes possible an improved mechanical function and thereby a higher precision of the pipetting device.

Of course, since the device described is for use with an incremental pipette, the pumping volume must be accurate and its accuracy must be ensured irrespective of the resistance encountered by the rod 21, otherwise the pumping facility comprising the system described would be just an ordinary pump.

The rod 21, therefore, carries a plate 21b made of a soft ferrite having a low magnetic remanence characteristic and disposed between two detecting windings 32, 33 of a movement detector. The windings 32, 33 are part of an electronic control circuit for the pipette and such circuit will now be described with reference to the diagrams shown in FIGS. 4–6.

FIG. 4 shows the control circuit for the complete pipetting device, the control circuit comprising a time base CL outputting periodic signals at a frequency of six times the pumping frequency—198 Hz in the present example—the periodic signals being shown in FIG. 6a. Time base CL outputs to the input of a control signal generator GS which also receives the output from a programmer PR serving to determine the pumping program, inter alia the number of increments to be pumped and the kind of operation—intake or discharge—and to give the start signal for the operating cycle. In another embodiment a time base CL outputting periodic signals at a frequency of 120 Hz is used.

Generator GS is preferably embodied by a shift register comprising three bistables arranged to provide a sequence of six conditions so as to produce a signal at each of its three outputs, viz. a valve control signal CS, a signal AS for routing the signal CS to each of the electromagnets 23 and 25, and a pumping control signal CP. FIGS. 6*b*, 6*c* and 6*d* show the signals CS, AS and CP respectively.

The generator GS outputs rectangular signals. If the same were to be transmitted as they are to the windings of the electromagnets 23–25, the associated drive rods 20–22 respectively would make abrupt movements and there would be a risk of making the liquid bubble, with detriment to the accuracy of the pipette. The signal CS must, therefore, go through a slope limiter LP and the signal CP must go to a position reference generator GR.

The function of the slope limiter LP is to limit the rate of current increase through the windings of the electromagnets 23 and 25 and thus make the movements of the valves less abrupt. FIGS. 6*e* and 6*g* show the electromagnet energizing signals arising from the signal CS and FIG. 6*f* shows the signal energizing the electromagnet 24. Before more details are given on the function of the reference generator GR which outputs the signal shown in FIGS. 6*f*, a description will be given of the selector enabling the signal CS to be applied selectively to the electromagnets 23 and 25.

The selector has two "exclusive OR" gates which have the references OU 1 and OU 2; the two inputs A, B of each such gate are respectively connected to an output of the programmer PR, such output acting in conventional manner to provide a signal only when the pipette is to operate on aspiration, and to the second output of generator GS, at which output the routing signal AS of FIG. 6*c* appears. An inverter IV is interposed between the second output of generator GS and the gate OU 1. Outputs X1 and X2 of the gates OU 1 and OU 2 control two electronic switches S1, S2 respectively for selectively connecting the slope limiter LP to power amplifiers AP 1 and AP 2 by way of two amplitude-adjusting elements A 1 and A 2 respectively. The outputs of amplifiers AP 1 and AP 2 are connected to the windings of the electromagnets 23, 25 respectively.

The operation of exclusive OR gates based on the equation:

$$X = A \oplus B = A.\bar{B} + \bar{A}.B$$

will be recalled. The truth Table becomes:

| A | B | X = A ⊕ B |
|---|---|---|
| 0 | 0 | 0 |
| 1 | 0 | 1 |
| 0 | 1 | 1 |
| 1 | 1 | 0 |

Because of the presence of the inverter IV, in the absence of signal at input A gate OU 1 stays closed for the first half of signal AS (FIG. 6*c*), whereas gate OU 2 which receives the first half of signal AS at its input B opens, the converse occurring in the second half of the same signal AS. On aspiration operation the simultaneous appearance of a signal at the A inputs of gates OU 1 and OU 2 changes the opening order thereof and therefore the operating order of the electromagnets 23 and at 25, the switching order of the signal CS processed by the slope limiter LP being inverted because of the switches S1, S2 operating in the reverse sequence.

The pumping control signal CP appearing at the third output of the control signal generator GS is processed in the position reference generator GR which is a means of determining the amplitude and the slope of the signal VRx of FIG. 6*f*. That output of generator GR at which the signal VRx appears is connected to one input of a controller RE whose second input is connected to the output Vx of a synchronous demodulator DS.

Before the processing of the signals VRx and Vx in the controller RE is further described, a description will be given, with reference to FIG. 5, of how the signal Vx is prepared.

There can be seen in FIG. 5 the diaphragm 12 associated with vessel 8, drive rod 21 with the soft-ferrite plate 21*b* and the moving armature 21*a*, the electromagnet 24 and the detector windings 32, 33 disposed on either side of plate 21*b* and providing movement detection. A 40 kHz oscillator OS is connected to one of the ends of each winding 32, 33 and to the input of the synchronous demodulator DS. In an improved embodiment, an 20 kHz oscillator is used. The windings 32, 33 are also connected to the demodulator DS by way of a zeroing potentiometer PA, which forms a Wheatstone bridge with the windings 32, 33, and of a preamplifier PRE. The same amplifies the voltage across the bridge diagonal, such voltage depending upon the inductances of the winding 32, 33, such inductances varying oppositely to one another when plate 21*b* moves along the longitudinal axis of rod 21.

The demodulator DS, which receives from preamplifier PRE a signal SM modulated at the frequency of the oscillator OS, is a sample and hold circuit adapted to sample and hold the peak values of the voltage modulated by the detector so as to indicate the position of rod 21 as it moves by and producing the signal Vx at its output connected to the input of controller RE. The same prepares a position error signal by comparing the signals VRx and Vx and converts the error signal into a signal for controlling the electromagnet current, such signal being amplified by a power amplifier AP. The latter signal tends to reduce the difference between VRx and Vx so that the movement of rod 21 does in fact correspond to the signal VRx determined by the position reference generator GR.

Referring again to FIG. 4, a counter and comparator CC is connected to the third output CP of signal generator GS and counts the increments and a second input of the device CC is connected to a volume selector SV for setting the number of increments. The output of the device CC is connected to programmer PR and transmits a stop signal thereto when the number of increments counted is equal to the number of increments to which the selector SV has been set.

FIG. 7 shows a variant of the device according to the invention, the view being merely of the means for actuating the diaphragm 8 determining the pumping increment volume. In the variant the control rod is in two parts 21', 21'' between which a spring 34 is compressed. A second spring 29' bears on the frame of the device by way of an abutment 37 and tends to maintain the rod part 21'' and the moving armature 21''*a* of electromagnet 24 in an axial position remote therefrom. That end of rod part 21'' which is opposite to the end connected to armature 21''*a* terminates in a cam 21''*c* embodied by two cylindrical portions 21''$c_1$ and 21''$c_2$ which are of different diameters from one another and are inter-connected by a conical portion $21''c_3$. Cam $21''c$ actuates two levers 35, 36 mounted for pivoting around two parallel pivots 35*a*, 36*a* respectively and bearing at one of their respective ends on cam $21''c$, while their other ends bear on a disc $21'd$ rigidly secured to rod part 21'. Spring 34 serves to take up clearance between the levers 35 and 36 and the two rod parts 21' and 21''.

When electromagnet 24 is energized it attacts the part 21'' and the levers 35, 36 move off the narrow portion $21''c_1$ to the larger portion $21''c_2$. The levers 35, 36 pivot, in the direction indicated by arrows F1 and F2 respectively, through an angle determined by the difference between the diameters of the portions $21''c_1$ and $21''c_2$. The pivoting angle of the levers 35, 36 determines the travel amplitude of the control rod part 21'. The volume variation arising from deformation of diaphragm 12 is, therefore, independent of the movement of the rod part 21'' and is determined only by the difference between the diameters of the two cylindrical portions of the cam $21''c$. Of course, the minimum travel amplitude of the rod part 21'' must be sufficient to make the levers move from the cam portion $21''c_1$ to the cam portion $21''c_2$.

Referring to another very important and useful feature of the device according to the invention, as is apparent more particularly in FIG. 2, that surface 10*a* of the pump casing 1—which is made of a transparent substance such as glass—which is parallel the surface 10 near the system 2 serves, in the zone between the plates 26 and 27, as an inspection window through which the entire duct 4 and the vessels 7, 8 and 9 are visible. This built-in visibility of the duct 4 and of the valves of the pipette is of considerable practical importance since it enables the presence of air bubbles to be perceived; of course, air bubbles make accurate pipetting impossible. Viewing can be further improved of the vasing 1 is illuminated at its right-hand or left-hand end in FIG. 1.

Also apparent in FIG. 2 are the very compact arrangement of the pipette elements, the reduced thickness of the pipette and the possibility of mounting the pipette on a support and removing it therefrom thanks to the presence of the connector 3 which can be introduced into a matching element (not shown) for connecting the system to the control circuit shown in FIGS. 4 and 5. The very flat construction of the pipette makes it possible to place a number of similar pipettes one beside another in a very reduced space. Also, a pipette can be replaced by another pipette, for instance, containing a different reagent, by a simple plugging and unplugging operation. Preferably, the pipette is arranged with the casing 1 vertical for improved degassing.

Figure 8:
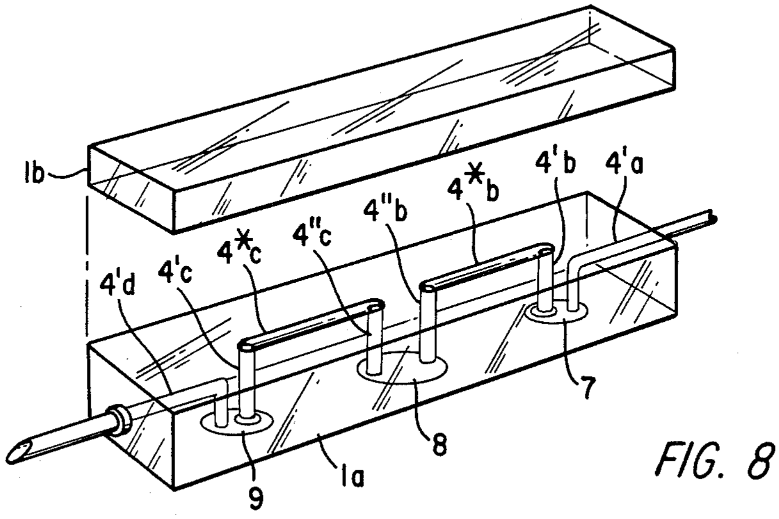
FIGS. 8 to 10 are perspective views of alternative forms of the pumping casing or enclosure.

It has been stated in the foregoing that the pump casing is preferably made of glass. It is an object of the variant shown in FIG. 8 to simplify the manufacturing process of such a pump casing by devising the same in two parts 1*a*, 1*b* adapted to be clamped together. The vessels 7, 8, 9 are contrived in that surface of the part 1*a* which is parallel to the surface adjacent the part 1*b*. Four ducts 4'*b*, 4''*b*, 4''*c*, 4'*c* extend through the part 1*a* perpendicularly to the two parallel surfaces. The ducts 4'*b* and 4'*c* extend to the vessels 7 and 9 respectively whereas the ducts 4''*b* and 4''*c* extend to the vessel 8. The other ends of the ducts 4'*b*, 4''*b* and 4''*c* are connected in pairs by ducts 4**b*, 4**c* respectively contrived in that surface of part 1*a* which is adjacent part 1*b*. The ducts 4'*a*, 4'*d* via which the vessels 7, 9 respectively can communicate with the exterior of the pump casing are each embodied as two apertures perpendicular to the respective surfaces to which they extend.

Figure 9:
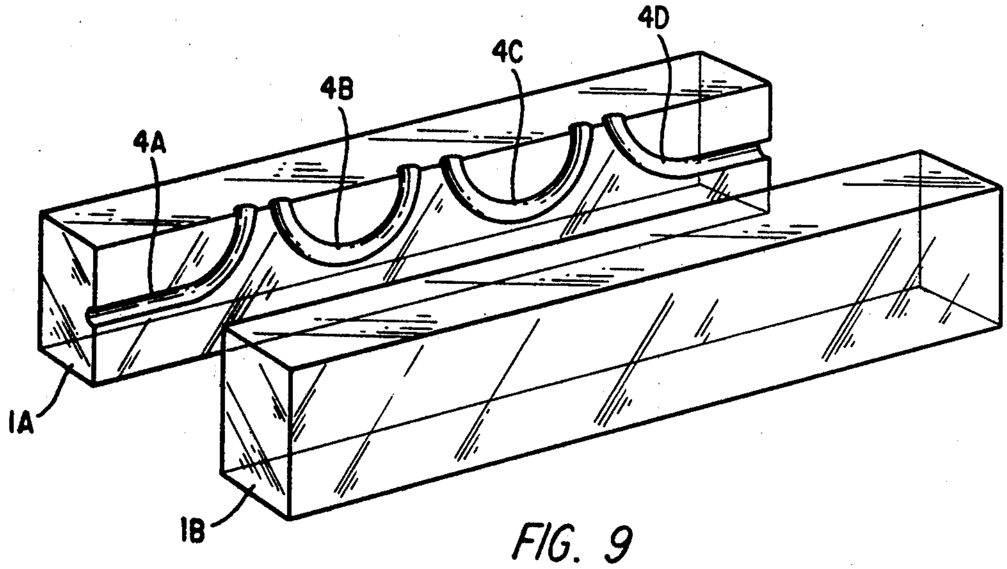
Figure 10:
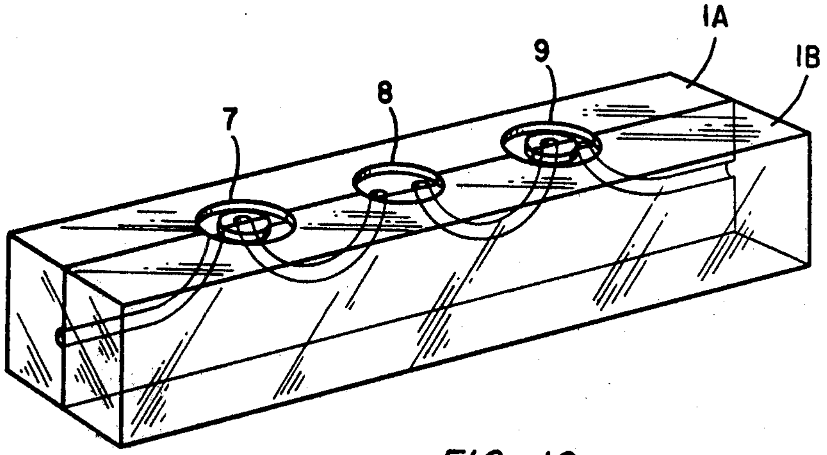

In another variant, shown in FIGS. 9 and 10, the pump casing is embodied by two parts 1A, 1B and the ducts 4A, 4C and 4D are contrived in that surface of the part or block 1A which is adjacent the part or block 1B. The ducts are contrived by ultrasonic machining, whereafter the two parts 1A, 1B are welded together as shown in FIG. 10. The vessels 7–9 are machined after the two parts 1A, 1B have been welded together.

Of course, the pump casing shown in FIGS. 3, 8 or 9 and 10 can also be used in a pipetting mechanism having constructional features other than those of the mechanism described. The device described could also be used with a casing other than those shown in the drawings just mentioned.

We claim:

1. A pipetting device for pipetting increments of constant volume comprising:

(a) pumping means including a duct connected at its end to one of a pair of access ports of a first valve and of a second valve, at least a portion of the duct wall being movable so that a variable-volume pipetting chamber is provided, the second access port of the valves being in the case of one valve the intake port for liquid to be pipetted by the device and in the case of the other valve the delivery port for pipetted liquid;

(b) three drive elements affixed to the pumping means along respective paths determined by guide means and connected one each to the valves, to the movable portion of the duct wall, and to retention means; and (c) means for sequentially determining the displacement of the drive elements in opposition to the retention means, the means for determining the displacement of the drive element connected to the movable portion of the duct wall of the pumping means comprising:

(1) an electromagnet energizable by an electrical current to act upon an armature operatively connected to the drive element to transmit to it a reciprocating motion along its path;

(2) a movement detector having a mobile part affixed to a rod which connects the armature to the movable portion of the duct wall, the detector producing a signal corresponding to the position of the rod; and (3) a controller adapted to provide, in dependence upon the difference between such signal produced by the detector and a reference signal, a command signal for so controlling the magnitude of an electrical current supplied for energizing the electromagnet that the armature is gradually and continuously displaced between first and second predetermined positions, whereby a displacement of the duct wall is effected which is characteristic of the volume desired for the pipetted increment.

2. A device according to claim 1 wherein the duct is formed in a rigid casing.

3. A device according to claim 2 wherein each valve has a vessel with a base, a wall and an outer edge, said base having a rib projecting therefrom to subdivide the vessel into two independent spaces, said rib having a crest or ridge which is coplanar with the outer edge of the corresponding vessel, the access ports of each said valve being contrived in the wall portion of the vessel associated with the first of said two spaces in the case of one port and in the wall portion of the second space in the case of the other port; and a diaphragm associated with such vessel, said diaphragm being sufficient extent to close the vessel by sealing-tight engagement of the peripheral portion of said diaphragm with the vessel outer edge, the diaphragm being rigidly secured to the drive element associated to the respective valve, said drive element being adapted to move the associated diaphragm into two different positions, one being in engagement with the ridge or crest of the rib and the other remote therefrom, and wherein the improvement further comprises the vessels of the valves being contrived in a surface of the casing and the duct is further comprised of: a third vessel contrived in a surface of the casing, a third diaphragm associated with the third vessel, said third diaphragm being of sufficient extent to close said third vessel by sealing-tight engagement of the peripheral portion of said third diaphragm with the outer edge of the third vessel, the third diaphragm being the moving portion of the duct wall and being rigidly secured to the drive element associated with said moving portion of the duct wall, the wall portion of said third vessel having two apertures; and two tubular passages contrived in the casing and respectively connected at one end to the first and second of said apertures and at the other end of the first access port of one of the valves in the case of one tubular passage and to the like access port of the other valve in the case of the second passage.

4. A pipetting device for pipetting increments of constant volume comprising:

(a) pumping means including a duct connected at its ends to one of a pair of access ports of a first valve and of a second valve, at least a portion of the duct wall being movable so that a variable-volume pipetting chamber is provided, the second access port of the valves being in the case of one valve the intake port for liquid to be pipetted by the device and in the case of the other valve the delivery port for pipetted liquid;

(b) three drive elements affixed to the pumping means along respective paths determined by guide means and connected one each to the valves, to the movable portion of the duct wall, and to retention means; and (c) means for sequentially determining the displacement of the drive elements in opposition to the retention means, the means for determining the displacement of the drive element connected to the movable portion of the duct wall of the pumping means comprising:

(1) an electromagnet energizable by an electrical current to act upon an armature operatively connected to the drive element to transmit to it a reciprocating motion along its path;

(2) a rod associated with a diaphragm forming the movable portion of the duct wall;

(3) a disc secured to the rod and extending coaxially thereof, the disc experiencing the opposing forces of a resilient member bearing on the disc surface remote from the diaphragm and one arm of a two-arm lever bearing on the disc surface facing the diaphragm, and the second arm of the lever forming a sliding element which the resilient member keeps in contact with a cam rigidly secured to the moving armature of the electromagnet, the cam profile being such that the lever can take up two different predetermined positions in corresponding positions of the cam, one position in which the cam tends to be retained by a resilient means, and another position into which the cam is moved against the resilient means and by means of the electromagnet, the angular distance between the lever and positions being characteristic of the amplitude of the travel of the drive element.

5. A device according to claim 4 wherein the duct is formed in a rigid casing.

6. A device according to claim 5 wherein each valve has a vessel with a base, a wall and an outer edge, said base having a rib projecting therefrom to subdivide the vessel into two independent spaces, said rib having a crest or ridge which is coplanar with the outer edge of the corresponding vessel, the access ports of each said valve being contrived in the wall portion of the vessel associated with the first of said two spaces in the case of one port and in the wall portion of the second space in the case of the other port; and a diaphragm associated with such vessel, said diaphragm being sufficient extent to close the vessel by sealing-tight engagment of the peripheral portion of said diaphragm with the vessel outer edge, the diaphragm being rigidly secured to the drive element associated to the respective valve, said drive element being adapted to move the associated diaphragm into two different positions, one being in engagement with the ridge or crest of the rib and the other remote therefrom, and wherein the improvement further comprises the vessel of the valves being contrived in a surface of the casing and the duct is further comprised of: a third vessel contrived in a surface of the casing, a third diaphragm associated with the third vessel, said third diaphragm being of sufficient extent to close said third vessel by sealing-tight engagement of the peripheral portion of said third diaphragm with the outer edge of the third vessel, the third diaphragm being the moving portion of the duct wall and being rigidly secured to the drive element associated with said moving portion of the duct wall, the wall portion of said third vessel having two apertures; and two tubular passages contrived in the casing and respectively connected at one end to the first and second of said apertures and at the other end of the first access port of one of the valves in the case of one tubular passage and to the like access port of the other valve in the case of the second passage.

* * * * *

Dedication 4,150,922.—*Gerard Cuenoud,* Grand-Lancy; *Rudolf Farkas,* Geneva; *Georges Revillet,* Onex and *Manuel Sanz,* Grand-Lancy, Switzerland. ELECTROMAGNET MOTOR CONTROL FOR CONSTANT VOLUME PUMPING. Patent dated Apr. 24, 1979. Dedication filed Mar. 26, 1984, by the assignee, *Battelle Memorial Institute.*

Hereby dedicates to the People of the United States the entire remaining term of said patent.

[*Official Gazette May 15, 1984.*]